United States Patent [19]

Müller

[11] 4,199,375
[45] Apr. 22, 1980

[54] PROCESS FOR REMOVING DUST AND GREASE FROM PHONOGRAPH RECORDS

[76] Inventor: Maximilian E. Müller, Habelschwerdter Allee 13, 1000 Berlin 33, Fed. Rep. of Germany

[21] Appl. No.: 903,907

[22] Filed: May 8, 1978

[30] Foreign Application Priority Data

May 13, 1977 [DE] Fed. Rep. of Germany ....... 2722390

[51] Int. Cl.² ............................................... B08B 7/00
[52] U.S. Cl. .......................................... 134/4; 134/40; 274/47
[58] Field of Search ...................... 134/4, 40; 252/163, 252/164, DIG. 3, DIG. 10; 260/29.6 BE; 274/47; 106/287 PR; 427/154, 155, 156

[56] References Cited

U.S. PATENT DOCUMENTS

| | | | |
|---|---|---|---|
| 2,372,982 | 4/1945 | Richards et al. | 427/155 |
| 2,431,684 | 12/1947 | Brophy | 427/155 |
| 2,811,456 | 10/1957 | Coleman et al. | 134/4 UX |
| 3,080,263 | 3/1963 | Conrose | 134/4 |
| 3,652,314 | 3/1972 | Castner | 274/47 X |
| 3,679,592 | 7/1972 | Schomburg | 252/DIG. 3 |
| 3,965,520 | 6/1976 | Maier | 274/47 X |
| 4,077,896 | 3/1978 | Bunegar et al. | 252/DIG. 3 |

FOREIGN PATENT DOCUMENTS 185634  10/1963  Sweden ..................................... 427/154

*Primary Examiner*—Marc L. Caroff
*Attorney, Agent, or Firm*—Parmelee, Johnson, Bollinger & Bramblett

[57] ABSTRACT

Dust and grease are removed from the surface of a phonograph record by applying to the surface a liquid composition containing polyvinyl alcohol and a solvent. Specifically, the composition includes polyvinyl alcohol, ethanol, distilled water, and triethylene glycol. The applied composition forms a self supporting film upon drying. Thereafter, the film is stripped from the surface.

4 Claims, No Drawings

PROCESS FOR REMOVING DUST AND GREASE FROM PHONOGRAPH RECORDS

DESCRIPTION

The invention relates to a process for removing dust and grease from objects.

In a known process of this kind (s. U.S. Pat. No. 3,994,744) a liquid is used for this purpose which does not dry to form a self supporting film. The residue is being removed by brushing and/or by means of a vacuum cleaner, whereby the contaminations are removed. This process is not suited for the cleaning of sensitive surfaces. Moreover, remainders of the residue and thus of the contaminations can be left on the surface to be cleaned.

In another known process (s. East German Patent Specification No. 81 048) a liquid drying agent is applied to an object to form a film. After drying, the film is stripped from the object. This process, however, is not used for the removal of dust and grease but is used for the decontamination of objects infected with radioactive substances. This liquid does not contain grease dissolving agents.

It is the task of the invention to develop a process which can serve for a thorough cleaning of highly sensitive surfaces such as of phonograph records, record matrices, glasses and lenses.

This task is solved by a process, whereby a liquid drying agent forms a self supporting film containing an agent reducing the surface tension and a grease dissolving agent which is applied to the object. The film is stripped off together with the contaminations after the film has been dried. The film contains no bubbles.

In this way a sensitive surface can be cleaned in a careful and extremely thorough manner: The dust particles are removed when stripping off the film. Grease is removed either in dissolved or non-dissolved form.

The film can be removed from the object by application of an adhesive strip to the rim of the film with the strip extending beyond the rim.

The above-described process is especially suited for the cleaning of such surfaces which cannot be reached easily, for example lenses.

EXAMPLE 20 parts of polyvinyl alcohol with an average molecular weight of 80,000 are mixed with 20 parts of ethanol. This paste is mixed with 20 parts of distilled water and then is stirred for approximately 15 minutes at approximately 75° C. The solution is then cooled and afterwards 30 parts of ethanol are added. Finally 30 parts of distilled water are added and 4 parts of softener, especially triethylene glycol, which reduces at the same time the static charge, are added.

In the above example, the polyvinyl alcohol serves as a film forming substance, the ethanol is an alcohol which serves as a grease dissolving agent and further serves to dilute the film forming substance, the softener serves to reduce the surface tension of the mixture, and the distilled water serves to dilute the mixture and soften dirt particles.

A record to be cleaned is covered with this solution. The solution dries to form a film which then is stripped off and contains all the contaminations.

What I claim is:

1. A process for removing dust and grease from the surface of a phonograph record by using a liquid composition capable of dissolving dust and grease and thereafter forming a film on the surface of said phonograph record, the steps of said process including:

(a) applying a liquid composition to the surface of a phonograph record,
    said liquid composition including a solvent in an amount effective to dissolve grease and dust from the surface of said phonograph record,
    said liquid composition including a polyvinyl alcohol in an amount effective to form a self supporting film on said surface of said phonograph record such that said dust and grease dissolved from said surface of said phonograph record is embedded within said self supporting film,
    (b) waiting until said liquid composition forms said self supporting film on said surface of said phonograph record,
    (c) applying an adhesive band over said self supporting film such that said adhesive band extends beyond the rim of said self supporting film,
    (d) removing said adhesive band to remove said self supporting film from said surface of said phonograph record,
    whereby said dust and grease is removed from said surface of said phonograph record without brushing.

2. A process for removing dust and grease from the surface of a phonograph record, the steps of said process including:

applying a liquid composition to the surface of a phonograph record for forming a self supporting film thereon,
    said liquid composition being formed from mixing 20 parts of ethanol with 20 parts of polyvinyl alcohol and 20 parts of distilled water; stirring said mixture; and adding 30 parts of ethanol, 30 parts of distilled water, and 4 parts of triethylene glycol thereto,
    removing said dust and grease from said surface of said phonograph record by stripping without brushing said self supporting film therefrom,
    whereby the surface of said phonograph record is cleaned.

3. A process as claimed in claim 2 wherein the step of removing by stripping without brushing includes:
    applying an adhesive band over said film,
    said adhesive band exceeding the rim of said film,
    removing said adhesive band,
    whereby said removal of said adhesive band removes said film from said surface of said phonograph record.

4. A process as claimed in claim 2 wherein said mixture is stirred for approximately 15 minutes at 75° C.

* * * * *